United States Patent
Herrick et al.

(10) Patent No.: US 6,910,904 B2
(45) Date of Patent: Jun. 28, 2005

(54) COMPRESSOR WITH TERMINAL ASSEMBLY HAVING DIELECTRIC MATERIAL

(75) Inventors: Todd W. Herrick, Tecumseh, MI (US); Rick L. Bunch, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 308 days.

(21) Appl. No.: 09/848,940

(22) Filed: May 4, 2001

(65) Prior Publication Data

US 2002/0155741 A1 Oct. 24, 2002

(51) Int. Cl.[7] .............................................. H01R 13/52
(52) U.S. Cl. ...................... 439/271; 439/466; 439/685; 439/934; 439/936; 439/940; 439/942
(58) Field of Search ................................ 439/466, 271, 439/685, 936, 199, 201, 519, 521

(56) References Cited

U.S. PATENT DOCUMENTS

| | | |
|---|---|---|
| 1,941,905 A | 1/1934 | Mair |
| 2,067,796 A | 1/1937 | Smith |
| 3,336,567 A | 8/1967 | Coldren |
| 3,388,368 A | 6/1968 | Sauber |
| 3,551,191 A | 12/1970 | Elbling et al. |
| 3,573,710 A * | 4/1971 | Wofford |
| 3,721,948 A | 3/1973 | Brandt et al. |
| 3,988,053 A | 10/1976 | Dodenhoff |
| 4,059,325 A | 11/1977 | Diminnie et al. |
| 4,073,562 A | 2/1978 | Karlskind |
| 4,085,993 A | 4/1978 | Cairns |
| 4,326,096 A * | 4/1982 | Leitmann ................ 174/84 R |
| 4,420,210 A | 12/1983 | Karol et al. |
| 4,753,607 A | 6/1988 | Heimbrock |
| 4,901,189 A | 2/1990 | Merriman et al. |
| 4,921,454 A | 5/1990 | Atherton et al. |
| 4,998,894 A * | 3/1991 | Gronvall .................... 439/321 |
| 5,035,653 A | 7/1991 | Honkomp et al. |
| 5,131,858 A | 7/1992 | Heimbrock |
| 5,312,265 A | 5/1994 | Fiori et al. |
| 5,364,283 A * | 11/1994 | Katoh et al. ................ 439/201 |
| 5,376,019 A * | 12/1994 | Shimirak et al. .......... 439/936 |
| 5,391,061 A * | 2/1995 | Iizuka et al. ............. 417/410.1 |
| 5,580,282 A | 12/1996 | Paterek |
| 5,584,716 A | 12/1996 | Bergman |
| 5,664,959 A | 9/1997 | Duell et al. |
| 5,795,170 A * | 8/1998 | Okabe ........................ 439/252 |
| 5,797,759 A * | 8/1998 | Mattis et al. ............... 439/201 |
| 6,109,977 A | 8/2000 | Baxter et al. |
| 6,132,251 A * | 10/2000 | Onoda ........................ 439/587 |

* cited by examiner

*Primary Examiner*—Neil Abrams
(74) *Attorney, Agent, or Firm*—Baker & Daniels

(57) ABSTRACT

A hermetically sealed compressor assembly including a housing, an electric motor located in the housing, a compression mechanism located in the housing and operatively coupled to the motor, and a terminal assembly comprising a cup-shaped terminal body and having electrically conductive pins extending therethrough. The cup-shaped terminal body extends through and is sealingly attached to the housing. A cluster block assembly is in communication with the terminal assembly and includes a cluster block fitted to the terminal body, the cluster block having free volume therein. The pins are electrically connected to the motor through the cluster block assembly. A cavity is defined between the interior of the cup-shaped terminal body and the cluster block, and a dielectric material substantially fills at least one of the cavity and the cluster block free volume. The cluster block assembly may also include one or more apertures to provide for the introduction of the dielectric material which may be introduced after the mating of the connectors.

19 Claims, 5 Drawing Sheets

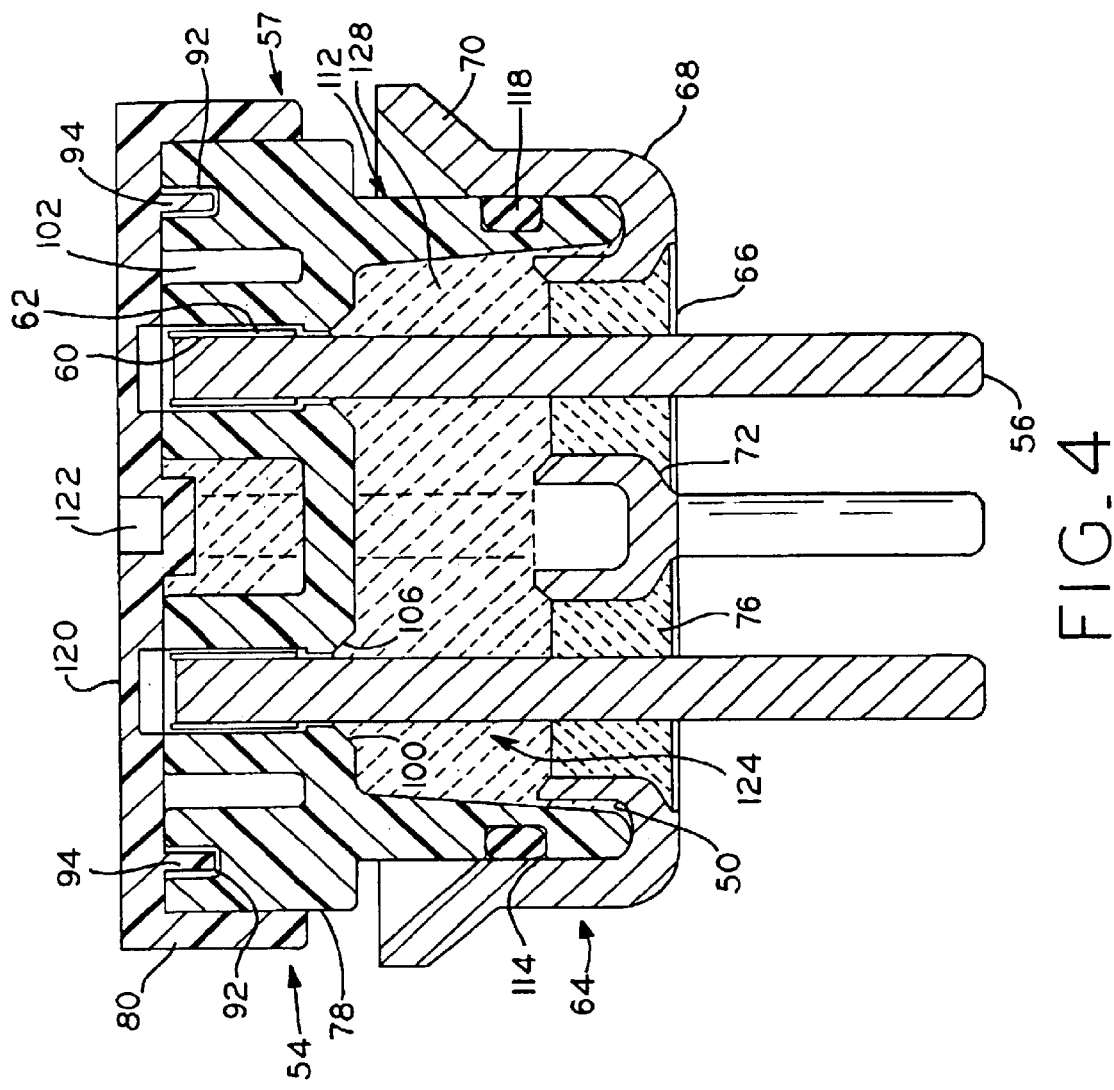
FIG._4
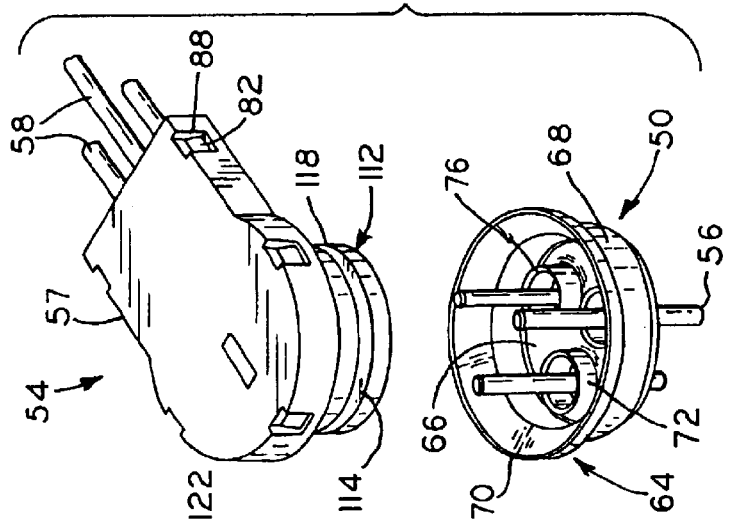
FIG._3

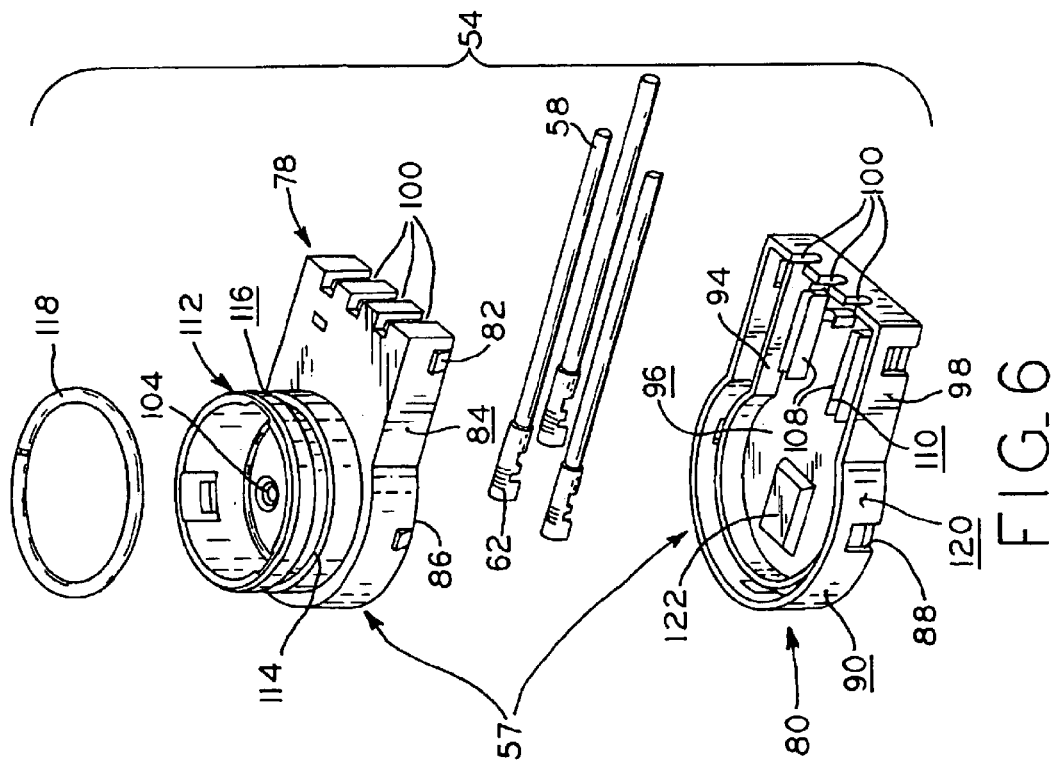
FIG._6
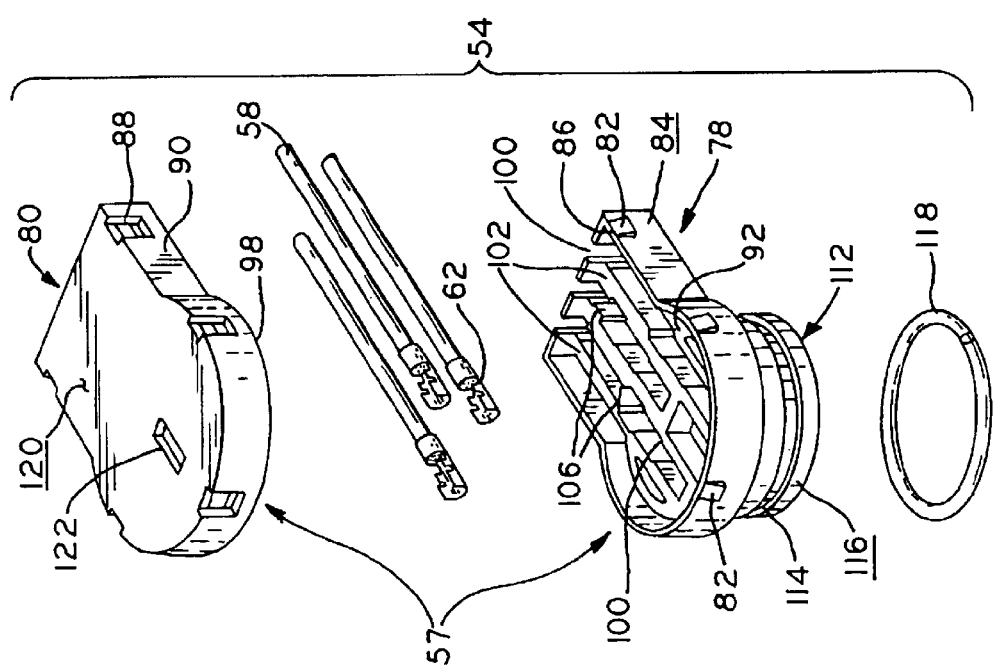
FIG._5

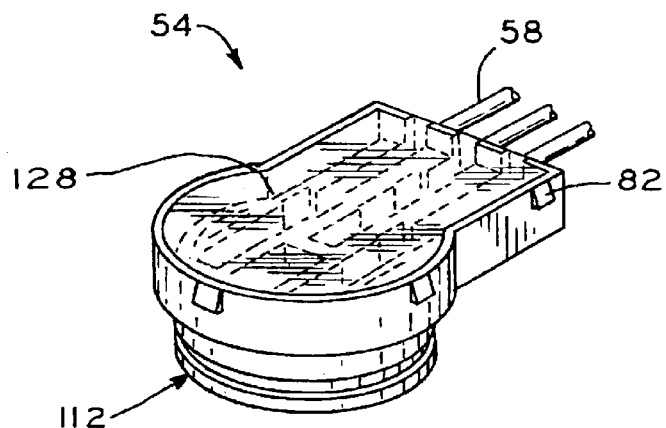
FIG_7
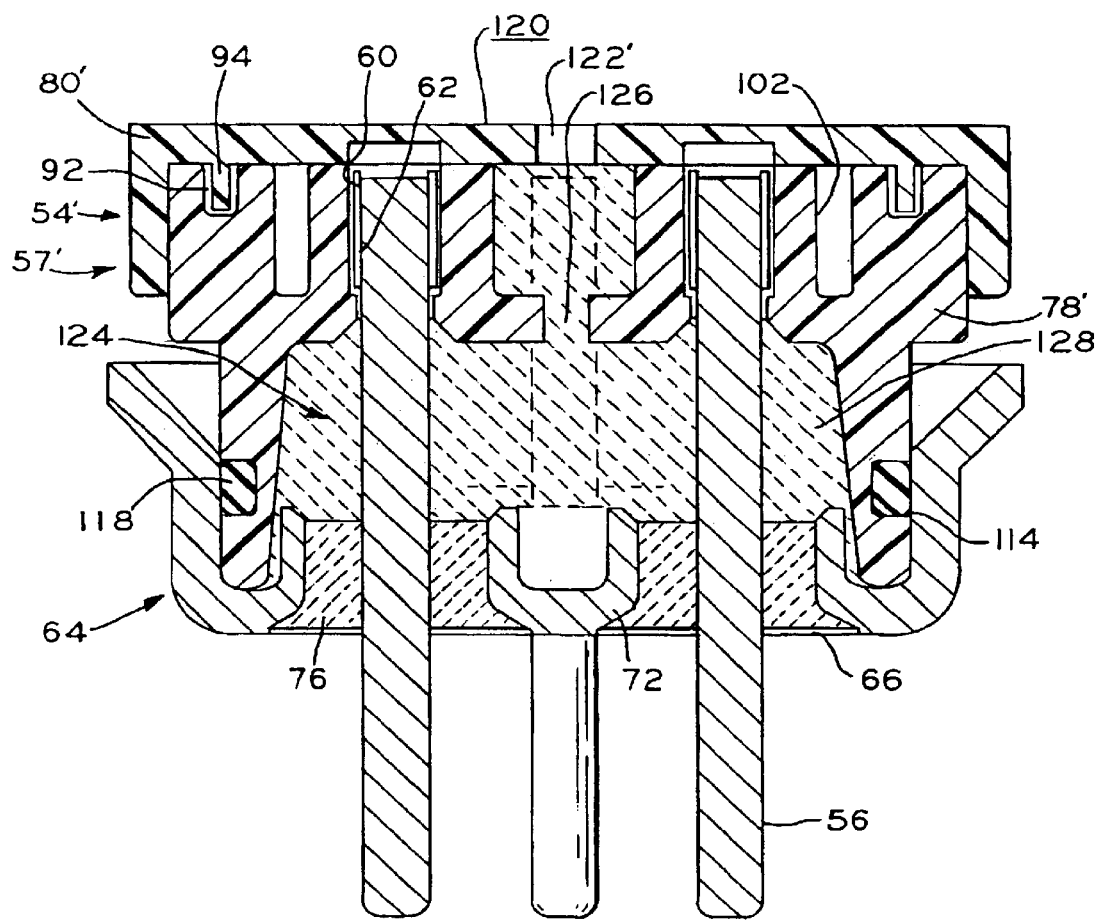
FIG_8

COMPRESSOR WITH TERMINAL ASSEMBLY HAVING DIELECTRIC MATERIAL

BACKGROUND OF THE INVENTION

1. Field of Invention

The present invention relates to electrical connections internal to hermetic compressor assemblies, particularly with regard to connectors designed to protect against electrical arcing across carbon deposits which may be formed within the compressor assembly, and methods of providing arc prevention within hermetic compressor assemblies.

2. Description of the Related Art

The terminal assembly extends through the sealed shell, or housing, of a hermetic compressor and includes a terminal body and a plurality of conductor pins which extend through apertures located in the terminal body. The terminal body is usually welded or brazed into an aperture provided in the compressor assembly housing. The conductor pins are secured within these apertures and are electrically insulated from the terminal body and the housing by fused glass insulators. An electric motor having a stator and a rotor is located within the housing, with the rotor being operatively coupled to a compression mechanism. The interior ends of the conductor pins are connected to lead wires which are connected to the windings of the motor stator. The exterior ends of the conductor pins are selectively connected to a source of electrical power. Thus, the motor is energized by the external power source through the terminal body, the lead wires, and the electrical connections therebetween. The electrical connections typically include an electrical connector attached to each lead wire and engaged with a corresponding conductor pin. A plurality of connectors and portions of their respective lead wires are normally assembled into, and housed by, a cluster block comprising the cluster block assembly.

The cluster block is dielectric, usually composed of an injection-molded plastic, and facilitates quick assembly of the lead wires to the terminal assembly. The cluster block also insulates the electrical connectors therein from each other, and from the terminal assembly and compressor housing, to a substantial degree. Usually, the interior of the cluster block is formed with a plurality of separated passages, each passage receiving one lead wire, and a plurality of recesses for receiving each of the connectors attached to the ends of the lead wires. Passages leading to these connectors are provided through the cluster block with the conductor pins of the terminal assembly extending therethrough.

During compressor operation, carbon or other conductive deposits from the motor may collect on the interior surfaces of the housing and perhaps the terminal assembly. These deposits may provide a conductive path between elements having different electrical potentials, thereby causing a short circuit or arc to develop along the conductive path. Such arcing results in the resistive heating of the deposits along the conductive path, in turn heating the elements on which the deposits collect. Such heating is known to sometimes cause the fused glass insulators surrounding the conductor pins to melt, thereby causing the compressor housing to leak pressurized gas at the terminal assembly.

Prior hermetic compressor assemblies often include some means for impeding such arcing. These means usually include a design which is intended to prevent the conductive deposits from collecting on the interior surface of the terminal assembly and its glass insulators. These means include electrical connector or cluster block assemblies through which the lead wires are attached to the interior ends of the conductor pins, and which, when assembled to the terminal assembly, substantially cover the conductor pins and lead wires. However, some prior cluster block assemblies may not completely preclude the formation of a conductive path between the lead wire ends and/or electrical connectors within the cluster block, and the terminal body or compressor housing.

Some of these previous cluster block assemblies include sealing features which help prevent the conductive deposits from entering the interior of the terminal assembly past its interface with the cluster block. One such cluster block assembly includes a cylindrical exterior wall portion that sealingly engages the cylindrical interior surface of the terminal body, as by an interference fit; the cylindrical interface may also include additional sealing means such as an O-ring. A problem associated with prior cluster block assemblies which sealably engage the terminal assembly in this manner is that they may be improperly installed, the proper seating of the block relative to the terminal assembly being hindered by the interference fit between the terminal body and the cluster block, or the O-ring therebetween.

Other cluster block assemblies include a layer of epoxy, or another elastomeric material, to surround the conductor pins and coat the insulators, or the use of sleeves to surround the conductor pins which are then filled with an epoxy or other material. A problem with such cluster block assemblies is that the conductor pins and the interior of the housing may not be completely sealed from each other to prevent the collection of the conductive materials on the terminal assembly, thereby allowing the previously mentioned arcing to occur. Another problem is that this sealing method requires additional steps in the assembly process, such as placing the layers on the respective parts prior to completion of the assembly, or that the process would require additional time for the seals to cure before completion of the assembly.

A cluster block assembly that is able to be assembled with little, if any additional steps, able to protect against the collection of conductive materials between elements at different electrical potentials, thereby prevent the formation of arcs, and able to avoid the above-mentioned shortcomings of previous cluster block assemblies, is highly desirable.

SUMMARY OF THE INVENTION

The present invention provides a hermetically sealed compressor assembly including a housing, an electric motor located in the housing, a compression mechanism located in the housing and operatively coupled to the motor, and a terminal assembly having a cup-shaped terminal body and including pins. The cup-shaped terminal body extends through and is sealingly attached to the housing. A cluster block assembly is in communication with the terminal assembly and includes a cluster block. The pins are electrically connected to the motor through the cluster block assembly. A cavity is defined between the interior of the cup-shaped terminal body and an interfacing surface of the cluster block, and a dielectric material substantially fills the cavity.

The present invention also provides a hermetically sealed compressor assembly including a housing, an electric motor located in the housing, a compression mechanism located in the housing and operatively coupled to the motor, and a terminal assembly having a cup-shaped terminal body and including pins. The cup-shaped terminal body extends through and is sealingly attached to the housing. A cluster block assembly is in communication with the terminal assembly, and includes a cluster block. The pins are electrically connected to the motor through the cluster block assembly. A liquid dielectric material is located within at least one of the cluster block and a cavity defined by the cluster block assembly and the terminal assembly, whereby the electrical connection between the cluster block assembly and the terminal assembly is insulated.

The present invention further provides a method for insulating an electrical connection within a hermetically sealed compressor assembly, including placing a dielectric gel into a terminal assembly having at least one conductor pin, placing the dielectric gel into a cluster block assembly having at least one connector, connecting the cluster block assembly and the terminal assembly together whereby the pin and the connector are electrically coupled, and allowing the dielectric gel to cure into a substantially solid state.

The present invention also provides a hermetically sealed compressor assembly including a housing, an electric motor located in the housing, a compression mechanism located in the housing and operatively coupled to the motor, and a terminal assembly having a cup-shaped terminal body extending through and sealingly attached to the housing and a plurality of conductor pins extending through the terminal body. A cluster block assembly is in communication with the terminal assembly and includes a cluster block fitted to the terminal body and having free volume therein; between the interior of the terminal assembly and the cluster block assembly is an interface. The plurality of electrically conductive pins are connected to the motor through the cluster block assembly. A dielectric material substantially fills at least one of the cavity and the cluster block free volume.

One advantage provided by the present invention is that by filling substantially all free volume within the cluster block assembly, and the cavity defined by the cluster block and the terminal assemblies, with the insulative gel, conductive deposits are prevented from entering and from accumulating on the interior surfaces of the terminal and cluster block assemblies. By filling all free volume within the cluster block assembly and the cavity defined by the cluster block and terminal assemblies with the insulative filling, no volume is left in which debris may enter and accumulate. This prevention of accumulation of deposits in turn precludes the formation of a conductive path between elements at different electrical potentials and an arc therealong.

An additional advantage provided by the present invention is that the insulative filling covers the fused glass insulators of the terminal assembly. This covering of the insulators helps prevent the potential melting thereof and subsequent leakage of pressurized gas.

Another advantage provided by the present invention is that it requires few additional assembly steps and little additional investment. In the first embodiment, the insulative filling is placed in each of the cluster block assembly and the cavity defined between the cluster block assembly and the terminal assembly prior to their connection to each other, requiring little additional time or effort. In the second embodiment, the insulative filling is injected into the cluster block assembly after the final connections between the cluster block and the terminal assembly are made, and subsequently flows into the cavity, requiring even less additional time or effort.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a disassembled view of a first embodiment of the inventive cluster block assembly and a terminal assembly;

FIG. 4 is an enlarged sectional view of the cluster block assembly and terminal assembly of FIG. 3;

FIG. 5 is a first exploded view of the cluster block assembly of FIG. 3 without its insulative filling;

FIG. 6 is a second exploded view of the cluster block assembly of FIG. 3 without its insulative filling;

FIG. 7 is a view of the cluster block assembly of FIG. 3 with its cover removed, showing the insulative filling therein; and FIG. 8 is an enlarged sectional view of a second embodiment of the inventive cluster block assembly showing its insulative filling.

Corresponding reference characters indicate corresponding parts throughout the several views. The exemplification set out herein illustrates embodiments of the invention, and such exemplification is not to be construed as limiting the scope of the invention in any manner.

DETAILED DESCRIPTION OF THE INVENTION

Figure 1:
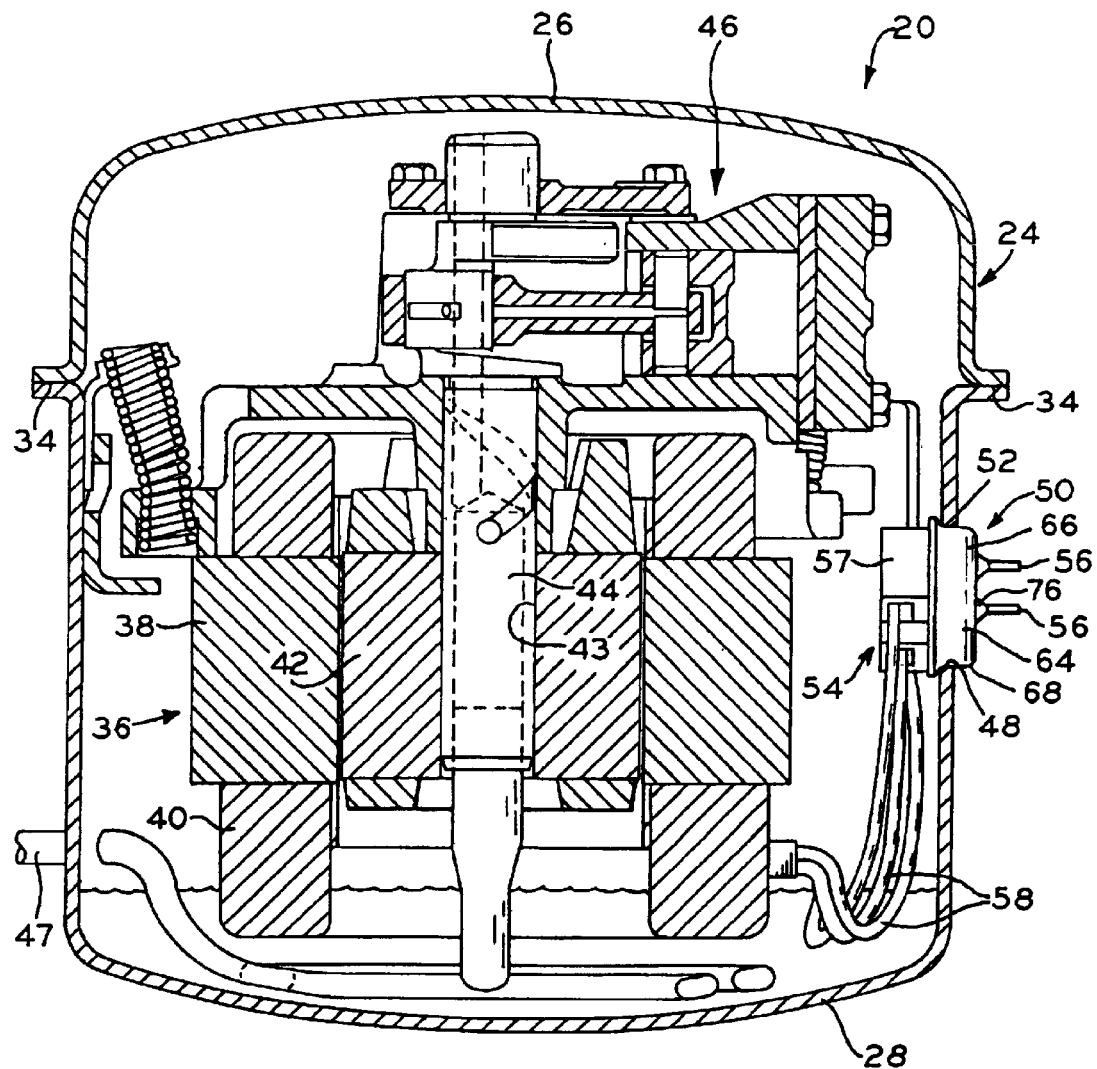
FIG. 1 is a longitudinal sectional view of a reciprocating piston compressor in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended.

Figure 2:
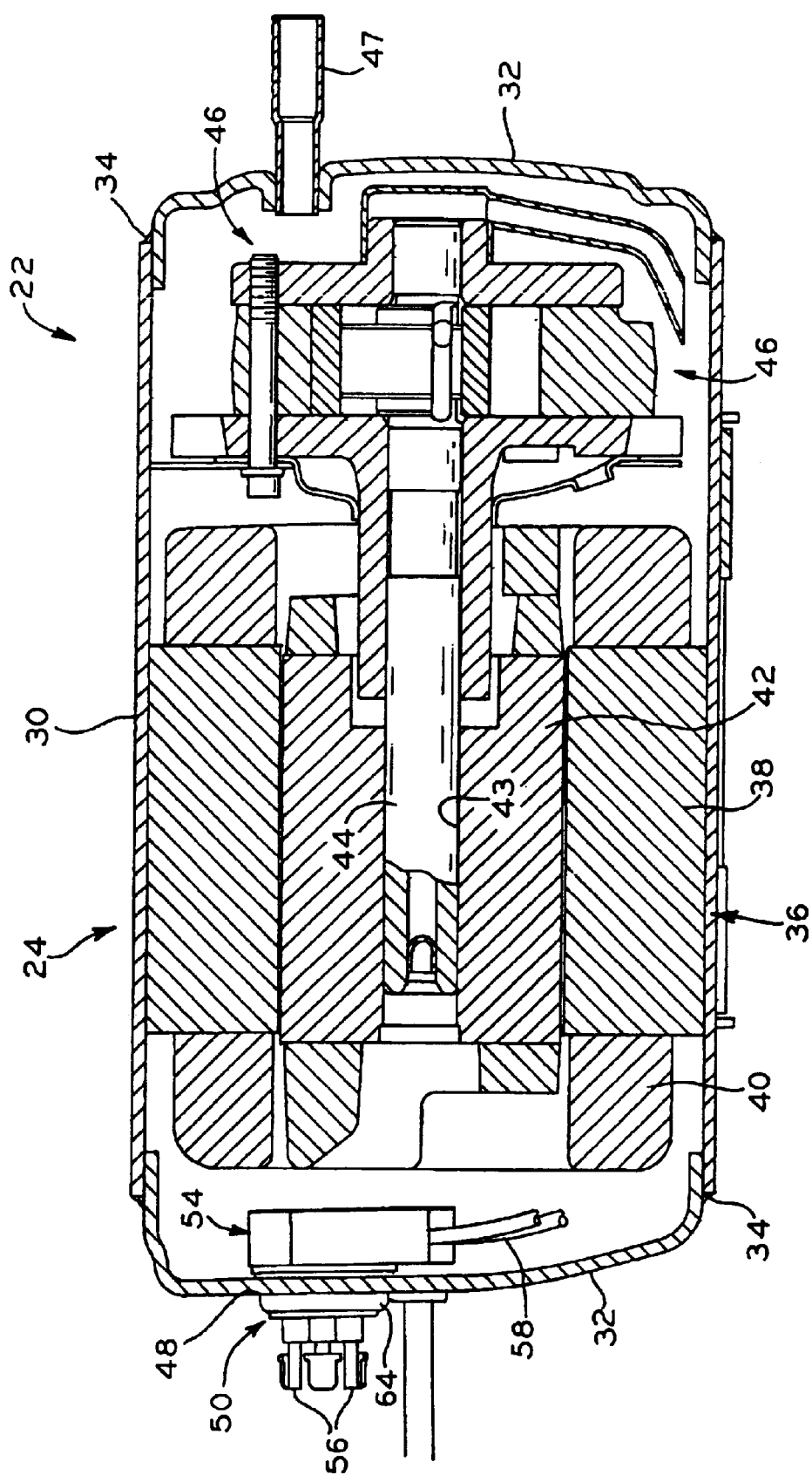
FIG. 2 is a longitudinal sectional view of a rotary compressor in accordance with the present invention.

Referring to FIGS. 1 and 2, reciprocating compressor assembly 20 and rotary compressor assembly 22 are shown as examples of types of hermetic compressor assemblies in which the present invention may be advantageously used. Other hermetic compressor types, such as, for example, a scroll compressor assembly, may also benefit from use of present invention.

The compressor assembly, which may be part of a refrigeration system (not shown) also comprising heat exchangers, an expansion device and refrigerant conveying lines, receives refrigerant substantially at suction pressure and discharges it substantially at discharge pressure. The compressor assembly may be of a "high side" type, in which the portion of the housing in which the motor is located is at discharge pressure, or of a "low side" type, in which the portion of the housing in which the motor is located is at suction pressure. The present invention may be beneficially employed in either a high side or a low side type.

Reciprocating compressor assembly 20 (FIG. 1) comprises housing 24 which includes upper housing portion 26 disposed atop lower housing portion 28. Reciprocating compressor assembly 20 is of the low side type, and in operation, refrigerant gas is drawn first into housing 24, and then into compression mechanism 46, the compressed gas then discharged directly from the compression mechanism and the housing via discharge tube or shock loop 47 and recirculated through the refrigerant system.

Housing 24 of rotary compressor assembly 22 includes main housing portion 30 and two end portions 32 (FIG. 2).

Rotary compressor assembly 22 is of the high side type, and in operation, refrigerant gas is drawn from outside its housing 24 directly into its compression mechanism 46 via a suction tube (not shown). Within compression mechanism 46, the gas is compressed to a higher, discharge pressure, and then discharged from the compression mechanism into its housing 24. Thereafter, the compressed gas is exhausted from the housing through discharge tube 47 and recirculated through the refrigerant system.

The housing portions for both compressor assemblies 20 and 22 are hermetically sealed at 34 by a method such as welding, brazing or the like. Hermetic compressor assemblies 20 and 22 each also include electric motor 36 disposed within housing 24. Motor 36 comprises stator 38 provided with windings 40, and rotor 42, which is surrounded by stator 38. Rotor 42 has central aperture 43 in which drive shaft or crankshaft 44 is secured by an interference fit.

As shown, an end of drive shaft 44 is operatively connected to compression mechanism 46, which may be of the reciprocating piston type, as in compressor assembly 20, the rotary type, as in compressor assembly 22, or the scroll type (not shown), each of which are well-known in the art. The general structure and operation of a reciprocating compressor assembly is disclosed in U.S. Pat. No. 5,266,016, the complete disclosure of which is hereby expressly incorporated herein by reference. The general structure and operation of a rotary compressor assembly is disclosed in U.S. Pat. No. 5,222,885, the complete disclosure of which is hereby expressly incorporated herein by reference. The general structure and operation of a scroll compressor assembly is disclosed in U.S. Pat. No. 5,306,126, the complete disclosure of which is hereby expressly incorporated herein by reference. Each of these patents is assigned to Tecumseh Products Company.

In lower housing portion 28 of low side reciprocating compressor 20 (FIG. 1) and one of end portions 32 of high side rotary compressor 22 (FIG. 2) is aperture 48, into which terminal assembly 50 is fitted and sealably secured at 52 by welding, brazing, or the like.

In the manner discussed above, an external power source (not shown) is electrically connected to conductor pins 56 of the terminal assembly, which are connected at 60, through inventive cluster block assembly 54 and jacketed lead wires 58 to stator windings 40. As shown in FIG. 4. each lead wire 58 is positioned within plastic cluster block 57 of cluster block assembly 54 and electrically connected to electrical connector clip 62, which engages the interior end of a conductor pin 56 in a manner which will be described in more detail hereinafter. Connector clip 62 is crimped to the uninsulated portion of lead wire 58 to provide the electrical and mechanical connection therebetween. Once electrical connection 60 between pins 56 and connector clip 62 is made, electrical power may be transferred from the external power source to stator windings 40 via pins 56 of terminal assembly 50 and lead wires 58. Energized, the stator electromagnetically induces rotation of rotor 42 to drive compression mechanism 46 through drive shaft 44.

Terminal assembly 50 includes metallic, cup-shaped terminal body 64 having end wall 66 and cylindrical sidewall 68, as best seen in FIGS. 3 and 4. Terminal body sidewall 68 is integrally formed with end wall 66 and extends approximately perpendicularly therefrom. Integral with the annular edge of side wall 68 opposite end wall 66 is flange 70, which abuts the interior periphery of housing aperture 48 (FIGS. 1 and 2). Located in end wall 66 is a plurality (usually three) of inwardly projecting collars 72 extending substantially parallel with side wall 68 and defining apertures 74 through which conductor pins 56 pass (FIG. 4). One fused glass insulator 76 is formed in each aperture 74 and maintains conductor pin 56 in relationship to collar 72; pins 56 are electrically insulated from terminal body 64, housing 24, and each other, by insulators 76, which also form a hermetic seal for housing 24.

As discussed above, unless preventive measures are taken, arcing may occur across terminal assembly 50 between lead wires 58, conductor pins 56, terminal body 64, and compressor housing 24 along a conductive path established by debris produced and collected on interior surfaces of the housing or terminal assembly during compressor operation. Debris may also collect on insulators 76 thereby allowing arcing across the same. To protect against the possibility of arcing between lead wires 58, conductor pins 56, terminal body 64, and compressor housing 24, cluster block 57 sealingly engages the inner surface of terminal body 64 (FIG. 4). In addition, the uninsulated portions of lead wires 58, to which electrical connector clips 62 are attached, are sealably disposed within the cluster block, as are some insulated portions of lead wires 58.

Referring to FIGS. 5 and 6, which show cluster block assembly 54, cluster block 57 includes base 78 and cover 80 secured together. Base 78 is injection molded plastic and is provided with integral tabs 82 protruding outwardly from outside surface 84 thereof. Tabs 82 are equally spaced around the periphery of base 78 adjacent edge 86. Cover 80 is also injection molded plastic and is provided with slots 88 in outer surface 90 of sidewalls 98. Cover 80 is placed atop base 78 such that each base tab 82 is aligned with and engages a respective cover slot 88. As shown in FIGS. 5 and 6, base 78 may be further provided with peripheral receiving groove 92 (FIG. 5) which is engaged by peripheral lip 94 projecting from inside surface 96 of cover 80 (FIG. 6). Lip 94 is offset from sidewalls 98 of cover 80 and follows the entire perimeter thereof. When cover 80 is joined to base 78, lip 94 is received in groove 92 to create a tortuous path between base 78 and cover 80, thereby ensuring that conductive debris cannot enter cluster block 57 through this joint.

Both base 78 and cover 80 are provided with narrow, U-shaped passages 100 formed in the peripheral walls thereof, each of which receives one of the plurality of jacketed lead wires 58. Each passage 100 in base 78 communicates with a channel defined in the base by walls 102, each channel being of a length and shape which precisely positions a connector clip 62 directly over conductor pin receiving holes 104 in base 78. Each passage 100 and channel is dimensioned to fit tightly about the insulative jacket of a lead wire 58; notably, channel walls 102 are provided with integral wire surrounding portions 106 which protrude inwardly, toward and in abutting contact with each lead wire 58. Additionally, integral wire surrounding portions 108 are provided in cover 80. Portions 108 extend from cover inner surface 96 into the portions of the channels in the base formed by wire surrounding portions 106. Wire surrounding portions 108 sealably contact the insulative jackets of lead wires 58, and retain lead wires 58 in a predetermined position between walls 102. Wire jacket-contacting surfaces 110 of wire surrounding portions 108 are concave; when wire surrounding portions 108 contact the surface of lead wires 58, surfaces 110 closely follow the cylindrical contour of the insulative jackets of wires 58 so as not to damage or crimp the wires.

Extending downwardly from base 78 is integrally formed cylindrical portion 112 which is the portion of cluster block 57 which sealably engages the cylindrical inner surface of terminal body 64. In order for cluster block assembly 54 to effectively prevent debris from contacting the inner surfaces of terminal assembly 50 and to make a good electrical connection 60, cluster block 57 must be properly seated within terminal body 64. The shown embodiment illustrates recess or groove 114 that may be circumferentially disposed in outer surface 116 of cylindrical portion 112 to receive O-ring 118. When cluster block 57 is seated within terminal body 64, conductor pins 56 are aligned with holes 104 in base 78. As cluster block 57 is forced into terminal body 64, the interior ends of pins 56 are engaged by connector clips 62 to provide an electrical connection therebetween. As shown in FIG. 4, O-ring 118 is compressed into groove 114, and provides an interference fit which retains cluster block assembly 54 to terminal assembly 50, and seals the interface between surface 116 of cluster block 57 and the inner surface of terminal body 64.

Located in outer surface 120 of cover 80 is blind recess 122 which is provided to receive a protrusion of an installation tool as disclosed in U.S. Provisional Patent Application No. 60/220,563, filed Jul. 25, 2000, to ensure proper tool, cluster block, and terminal assembly alignment. Recess 122, formed in cover 80, protrudes inwardly from outer surface 120 and is closed from the inner chamber of cluster block 57. Recess 122 is shown as being rectangular, but may be of any shape suitable to receive the tool protrusion.

Referring now to FIG. 7, insulative filling 128 fills any free volume found within cluster block assembly 54, such as passages 100 and grooves 92. Insulative filling 128 is a generally dielectric material which is used for insulation purposes, such as epoxy, Mylar, polyimide, or other polymers which maintain a low dielectric constant. Insulative filling 128 covers lead wires 58 to the point of connection with cover 80 such that if cover 80 were removed, a solid material would be revealed (as shown). Terminal body 64 is filled with insulative filling 128 before cluster block assembly 54 is installed onto terminal assembly 50. Prior to the assembly of cover 80 and 78, insulative filling 128, in its viscous liquid or gelatinous state, is disposed within cluster block assembly 54 by any suitable means. After the assembly of terminal body 64 and cluster block assembly 54, insulative filling 128, which may still be in a viscous liquid state, is allowed to cure into a solid state. Notably, the cured insulative filling may be, but need not be, rigid; it may be soft and pliable.

With reference to FIG. 8, a second embodiment of the present invention is shown. Located within outer surface 120' of cover 80' is aperture 122' which is the means of ingress into the assembled cluster block 57', terminal assembly 50, and cavity 124 defined therebetween, for injection of dielectric material or insulative filling 128 after cluster block assembly 54' has been fully connected to terminal body 64. Aperture 122' is formed within cover 80' and opens directly into cluster block 57', providing a means of ingress to cluster block assembly through which filling 128 may be injected. After insulative filling 128 has entered cluster block 57', insulative filling 128 enters cavity 124 and terminal assembly 50 through a second aperture 126 formed within base 78' of cluster block assembly 54', which provides a means of ingress to cavity 124 through which filling 128 may flow. Apertures 122' and 126 may be of any shape and size suitable for allowing insulative filling 128, in its viscous liquid state, to flow into all free volumes in cavity 124 and cluster block 57'.

After insulative filling 128 is injected as a viscous liquid or gel into the cluster block assembly and the cavity, filling substantially all free volume therein, it is allowed to cure. Upon curing, insulative filling 128 will become solid, as described above.

By filling all free volume in cluster block assembly 54' and terminal assembly 50, a means of sealing and insulating to prevent the accumulation of conductive deposits and to reduce the chances of arcing within the assemblies is provided. This reduction in the possibility of arcing in turn reduces the possibility that the glass insulators would melt and allow a breach in hermeticity.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A hermetically sealed compressor assembly comprising:
    a hermetically sealed housing;
    an electric motor disposed in said housing;
    a compression mechanism disposed in said housing and operatively coupled to said motor;
    a terminal assembly comprising a cup-shaped terminal body extending through and sealingly attached to said housing, said terminal assembly having electrically conductive pins extending through and insulated from said terminal body;
    a cluster block assembly disposed within said housing and connected to said terminal assembly, said pins electrically connected to said motor through said cluster block assembly, said cluster block assembly including a cluster block which is fitted to said terminal body, said cluster block defining a free volume therein;
    a cavity being defined between the interior of the cup-shaped terminal body and an interfacing surface of said cluster block; and
    a substantially solid dielectric material substantially filling at least one of said cavity and substantially all said free volume within said cluster block assembly,
        wherein said cluster block assembly includes a means of ingress for said dielectric material to enter at least one of said cavity and said free volume when said cluster block is fitted to said terminal body.

2. The hermetic compressor assembly of claim 1, wherein said dielectric material substantially conforms to the surfaces over which it extends.

3. The hermetic compressor assembly of claim 1, wherein said cluster block includes a cover and a base fitted to said cover, and wherein said means of ingress comprises a first aperture extending through said cover and in communication with said free volume.

4. The hermetic compressor assembly of claim 3, wherein said means of ingress further comprises a second aperture extending through said base, said second aperture communicating between said free volume and said cavity.

5. The hermetic compressor assembly of claim 1, wherein said dielectric material is one of an epoxy and a dielectric polymer.

6. The hermetic compressor of claim 5, wherein said dielectric material is a cured gel and is substantially solid.

7. The hermetic compressor assembly of claim 1, further comprising jacketed wires through which said pins and said motor are electrically connected, and wherein said cluster block further comprises passages through which said jacketed wires extend, said passages defining a portion of said free volume and also containing a portion of said dielectric material in contact with the jackets of said wires.

8. A hermetically sealed compressor assembly comprising:
   a hermetically sealed housing;
   an electric motor disposed in said housing;
   a compression mechanism disposed in said housing and operatively coupled to said motor;
   a terminal assembly comprising a cup-shaped terminal body extending through and sealingly attached to said housing, said terminal assembly having electrically conductive pins extending through and insulated from said terminal body;
   a cluster block assembly disposed within said housing and connected to said terminal assembly, said pins electrically connected to said motor through said cluster block assembly, said cluster block assembly including a cluster block which is fitted to said terminal body to define a cavity between said terminal body and said cluster block, said cluster block defining an aperture extending through said cluster block and externally communicating with said cavity when said cluster block is fitted to said terminal body; and
   a liquid dielectric material which has been deposited within at least one of said cluster block and said cavity through said aperture and which has been allowed to cure to a substantially solid state, whereby the electrical connection between said cluster block assembly and said terminal assembly is insulated.

9. The hermetic compressor assembly of claim 8, wherein said dielectric material substantially conforms to the surfaces over which it extends.

10. The hermetic compressor assembly of claim 8, wherein said dielectric material is injected subsequent to the connection of said cluster block assembly to said terminal assembly.

11. The hermetic compressor assembly of claim 8, wherein said dielectric material is placed prior to the connection of said connector assembly to said terminal assembly.

12. The hermetic compressor of claim 8, wherein said dielectric material is cured after being placed, whereby said dielectric material becomes substantially solid.

13. The hermetic compressor assembly of claim 8, wherein said dielectric material is one of an epoxy and a dielectric polymer.

14. The hermetic compressor assembly of claim 8, further comprising jacketed wires which are electrically connected to said pins and said motor, and wherein said cluster block further comprises passages through which said wires extend, said passages containing a portion of said dielectric material which is in contact with the jackets of said wires.

15. A hermetically sealed compressor assembly comprising:
   a hermetically sealed housing;
   an electric motor disposed in said housing;
   a compression mechanism disposed in said housing and operatively coupled to said motor,
   a terminal assembly comprising a cup-shaped terminal body extending through and sealingly attached to said housing, said terminal assembly having a plurality of conductor pins extending through and insulated from said terminal body;
   a cluster block assembly disposed within said housing and in communication with said terminal assembly, said cluster block assembly including a cluster block which is fitted to said terminal body, said cluster block having a free volume therein;
   a cavity defined between the cup-shaped terminal body and said cluster block;
   said plurality of conductor pins electrically connected to said motor through said cluster block assembly;
   a substantially solid dielectric material substantially filling said cavity and said cluster block free volume; and
   wherein said cluster block provides a means of ingress for said dielectric material to enter said free volume of said cluster block and said cavity after said cluster block assembly is fitted to said terminal assembly.

16. The hermetic compressor assembly of claim 15, wherein said dielectric material substantially conforms to the surfaces over which it extends.

17. The hermetic compressor assembly of claim 15, wherein said cavity is closed and has no means of ingress thereinto once said cluster block assembly is fitted to said terminal assembly.

18. The hermetic compressor assembly of claim 15, wherein said dielectric material is one of an epoxy and a dielectric polymer.

19. The hermetic compressor of claim 15, wherein said dielectric material is a cured gel and is substantially solid.

* * * * *